Patented Sept. 21, 1943

2,330,108

UNITED STATES PATENT OFFICE 2,330,108

DECORATIVE EFFECT IN POLYSTYRENE MOLDINGS

Russell R. Bradshaw, Midland, Mich., assignor to The Dow Chemical Company, Midland, Mich., a corporation of Michigan No Drawing. Application February 24, 1939, Serial No. 258,212

17 Claims. (Cl. 260—23)

This invention relates to the production of decorative effects in polystyrene moldings.

An object of the invention is to provide a simple inexpensive method of preparing polystyrene molded objects having a lustrous pearlescent appearance.

According to the invention, polymerized styrene is mixed together with a small proportion of a soap-like material and the resulting mixture is molded under heat and pressure into objects having a high surface luster and a pleasing nacreous appearance resembling mother-of-pearl.

In practice, a charge of polystyrene and a small proportion, e. g. between about 0.5 and about 10 per cent by weight, of a soap-like material is heated to a temperature at which the polystyrene is of a plastic or dough-like consistency, and is then subjected to mechanical working so as to incorporate the soap-like material into the plastic mass. This working is preferably carried out in a kneading machine or on heated rolls, but other types of mixing apparatus may be employed. After the mixing operation, the plastic mass may be molded directly into objects of any desired size or shape, either by compression- or injection-molding, according to known procedures. Alternatively, after mixing, the plastic mass may be cooled and ground or otherwise reduced to a powder, which is then used in subsequent molding operations.

A variety of decorative effects may be produced in polystyrene according to the invention by varying the proportion of soap-like material used and by carefully controlling the mixing and molding procedures. For example, when the polystyrene and soap are kneaded together for a short time only so that mixing is incomplete, and the mixture is then molded, objects of delicate striated or marbleized iridescent appearance are obtained. However, when a thorough mixing operation is carried out so as to produce a homogeneous plastic mass, the articles molded therefrom resemble natural pearl. Further interesting effects may be produced by incorporating dyes, pigments, plasticizers, etc., in the charge of polystyrene and soap-like material prior to or during the mixing procedure.

Among the soap-like materials which may be employed in the invention are the sodium, potassium, and magnesium soaps, i. e. the sodium, potassium, and magnesium salts of higher fatter or soap-forming acids such as stearic, palmitic, oleic, and ricinoleic acids. Ordinary household soaps are entirely satisfactory. In practice, the soap-like material is preferably added to the polystyrene in the form of chips, flakes, soap "beads," or powder, although other forms may be used.

Polystyrene molded objects according to the invention, in addition to having the pleasing appearance described, are stable towards light and are unaffected by water or aqueous solutions. They possess the further advantage that they are easier to eject from the mold in which they are formed than ordinary polystyrene moldings.

Other modes of applying the principle of the invention may be employed instead of those explained, change being made as regards the details disclosed, provided the method or product stated by any of the following claims, or the equivalent of such stated method or product be employed.

I claim:

1. A process of preparing a polystyrene plastic composition characterized by a nacreous sheen, which comprises forming a plastic mixture consisting essentially of 100 parts of polystyrene and from about 0.5 to about 10 parts of a salt selected from the class consisting of the sodium, potassium and magnesium salts of soap-forming higher fatty acids, this salt being present in an amount effective to cause the nacreous sheet, and thereafter molding said plastic mixture.

2. A process as described in claim 1, wherein the salt is a sodium salt of a soap-forming higher fatty acid.

3. A process as described in claim 1, wherein the salt is sodium stearate.

4. A process as described in claim 1, wherein the salt is sodium palmitate.

5. A process as described in claim 1, wherein the salt is sodium oleate.

6. The method of forming a polystyrene molding powder which comprises heating polystyrene to a temperature at which it is plastic, kneading the polystyrene while hot, together with between about 0.5 and about 10 per cent by weight of a salt selected from the class consisting of the sodium, potassium and magnesium salts of soap-forming higher fatty acids, the salt being present in amount effective to cause a nacreous sheen, whereby a nacreous mixture consisting essentially of polystyrene and said salt is formed, cooling the mixture and reducing it to a powder.

7. A process as described in claim 6, wherein the salt is a sodium salt of a soap-forming higher fatty acid.

8. A process as described in claim 6, wherein the salt is sodium stearate.

9. A process as described in claim 6, wherein the salt is sodium palmitate.

10. A process as described in claim 6, wherein the salt is sodium oleate.

11. A molded object characterized by a nacreous sheen and consisting essentially of 100 parts of polystyrene and between about 0.5 and about 10 parts of a salt selected from the class consisting of the sodium, potassium and magnesium salts of soap-forming higher fatty acids, this salt being present in an amount effective to cause a nacreous sheen.

12. A molded object as described in claim 11, wherein the salt is a sodium salt of a soap-forming higher fatty acid.

13. A molded object as described in claim 11, wherein the salt is sodium stearate.

14. A molded object as described in claim 11, wherein the salt is sodium palmitate.

15. A molded object as described in claim 11, wherein the salt is sodium oleate.

16. A molded polystyrene object presenting a marbleized iridescent appearance and consisting essentially of polystyrene having non-homogeneously mixed therewith between about 0.5 and about 10 per cent by weight of a salt selected from the class consisting of the sodium, potassium and magnesium salts of soap-forming higher fatty acids.

17. A polystyrene molding powder suitable for molding into objects having a nacreous appearance and consisting essentially of polystyrene having incorporated therewith between about 0.5 and about 10 per cent by weight of a salt selected from the class consisting of the sodium, potassium and magnesium salts of soap-forming higher fatty acids, this salt being present in an amount effective to cause a nacreous sheen.

RUSSELL R. BRADSHAW.